United States Patent [19]

Masuda et al.

[11] 3,736,441

[45] May 29, 1973

[54] GALVANO-MAGNETRO EFFECT APPARATUS

[75] Inventors: Noburu Masuda, Kawaguchi; Masai Kuroyanagi, Tokyo, both of Japan

[73] Assignee: Denki Onkyo Co., Ltd., Tokyo, Japan

[22] Filed: May 10, 1972

[21] Appl. No.: 252,090

[30] Foreign Application Priority Data

May 12, 1971 Japan ............................31760/71

[52] U.S. Cl. .................307/149, 179/90 K, 335/205, 338/32, 340/365

[51] Int. Cl. ....................................................H02j 3/00

[58] Field of Search .........................338/32; 340/365, 340/174 HA, 174 PM, 174 EB; 178/17 C, 17 R; 335/205; 235/145, 146; 179/90 K; 197/98; 307/149

[56] References Cited

UNITED STATES PATENTS 3,430,226 2/1969 Chow et al.........................340/365 X
3,119,996 1/1964 Comstock..........................340/365 X
2,997,703 8/1961 Powell.................................179/90 K
3,585,297 6/1971 Scuitto................................178/17 C

*Primary Examiner*—C. L. Albritton
*Attorney*—James E. Armstrong, Harold C. Wegner and John H. Harman

[57] ABSTRACT

A galvano-magnetro effect apparatus, wherein a plural number of gaps are formed in a direction at a right angle to the direction of a magnetic flux flowing in a looped magnetic path, galvano-magnetro effect devices are fixedly provided in said gaps, magnetic pieces which move in a direction at a right angle to the direction of the magnetic flux are provided in said gaps and said galvano-magnetro effect devices are selectively operated by actuating said magnetic pieces with a selecting means.

12 Claims, 14 Drawing Figures

GALVANO-MAGNETRO EFFECT APPARATUS

BACKGROUND OF THE INVENTION

The present invention relates to a switching apparatus employing galvano-magnetro effect devices (hereafter referred to as the "device") such as a magnetro-resistance effect devices or Hall effect devices.

The conventional apparatus of this type is designed so that one push button requires one magnetic path. It is, accordingly, disadvantageous because, in case of an electrical equipment provided with a number of push buttons such as, for example, a desk type electronic computer, the number of magnetic paths and devices increases and therefore the production cost becomes high. It is also disadvantageous because it is difficult to make the characteristic of each magnetic path uniform if these are provided many magnetic paths and therefore the output characteristic differs with each magnetic path. Furthermore, since the magnetic path is required to be extremely small in size to meet the recent tendency to compact design of electrical apparatuses, the production is troublesome.

The present invention provides a galvano-magnetro effect apparatus capable of eliminating said disadvantages.

SUMMARY

A galvano-magnetro effect apparatus comprised of a magnetic path which is divided by at least two gaps which intersect at a right angle to the direction of the magnetic flux, at least one galvano-magnetro effect device such as, for example, a magnetro-resistance effect device or a Hall effect device which is fixed at the internal surface of a yoke end of the magnetic path forming each gap so that said device is provided in said gap, magnetic pieces which are inserted into the gaps respectively and move in a direction at a right angle to the direction of the magnetic flux in the gaps to vary the magnetic flux density applied to each device, resetting means which respectively reset said magnetic pieces to their home positions, operating levers which are respectively attached to said magnetic pieces and are arranged so that said levers are, at least, partly parallel with each other, select bars which are provided in a number, at least, one larger than the number of said levers so that said select bars are across over or under at a right angle to the group of operating levers and are usually prevented from pushing up or down the operating levers by the resetting means and detection circuits which are respectively provided corresponding to said gaps and function with the action of respective devices provided in the gaps, wherein said each select bar is devised to selectively actuate an operating lever or levers of the group of operating levers when each select bar is operated against the resetting means, said each operating lever is devised to cause said magnetic piece move against the resetting means when the operating lever or levers are selected by each select bar and each select bar is devised so that one operating lever of the group of operating levers is selected and/or the operating levers of the group of operating levers are selected in different combinations, that is, selection of the select bars is different each time.

BRIEF DESCRIPTION OF THE DRAWINGS

The present invention is illustrated in detail by the accompanying drawings whereon.

DETAILED DESCRIPTION OF THE INVENTION

Figure 1:
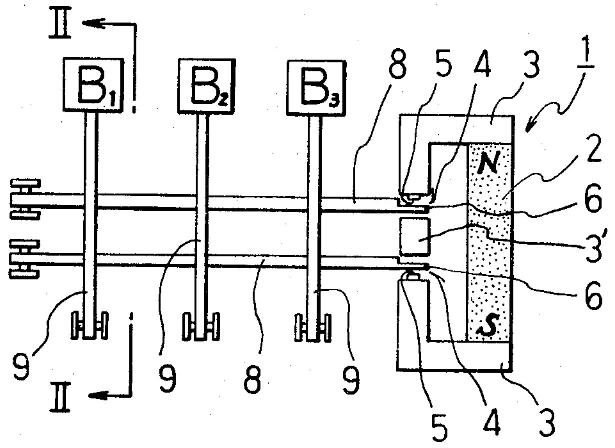
FIG. 1 is a plan view of the apparatus according to the present invention.
Figure 2:
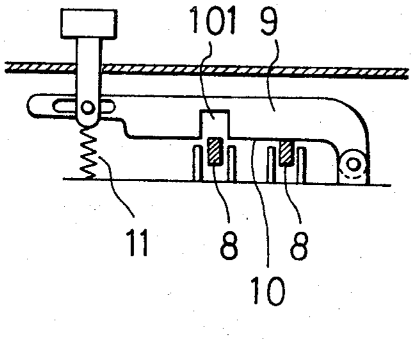
FIG. 2 is a sectional view as seen along line II—II shown in FIG. 1.
Figure 3:
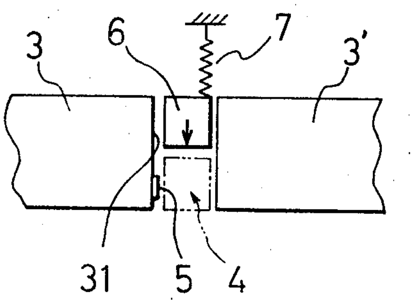
FIG. 3 is a magnified side view of an important part of the magnetic path employed in the apparatus.

Referring to FIGS. 1 to 3, there is shown magnetic path 1 comprised of magnet 2, fixed yokes 3 being fixed at magnetic poles N and S of said magnet and independent yoke 3′ being isolated like an island through gaps 4 between a pair of yokes 3.

Galvano-magnetro effect devices 5 are arranged respectively in gaps 4 and are positioned at internal surfaces 31 of the yokes forming gaps 4 to receive the magnetic flux flowing in the magnetic path. Magnetic pieces 6 are respectively provided in said gaps 4 so as to move in a direction intersecting at a right angle to the direction of the magnetic flux and are positioned so that they are always kept away from the devices (or so that they are always opposed to the devices as shown with a broken line) by resetting means 7 such as, for example, a spring as shown with a solid line in FIG. 3. Said magnetic pieces 6 are arranged so as to be moved against said resetting means by non-magnetic operating levers 8 and are designed so as to change the magnetic flux density applied to the devices while being opposed to said devices 5 as shown with a broken line in FIG. 3 (or while being kept away from the devices as shown with a solid line in FIG. 5).

A group of select bars 9 is oppositely provided above or below the group of said operating levers 8 and the surfaces of select bars 9 being opposed to said operating levers 8 are provided with selecting means 10 such as the pushing edge which is formed by at least one notch 101 and selectively pushes and releases an operating lever or levers with vertical movement of each select bar according to the theory of mathematical permutation and combination.

In addition, resetting means 11 such as, for example, a resetting spring is provided to usually keep each select bar away from each operating lever.

Each notch 101 is designed so that it fits on an operating lever, which is not selected, and does not lower the lever when the select bar having said notch goes down; accordingly, only the operating lever or levers which come in contact with pushing edge 10 are lowered.

Each device 5 is provided with detection circuit 12 which is actuated by operation of the device and this detection circuit is connected to conversion circuit 13 which reads the action of the detection circuit and converts it into a special signal.

The apparatus according to the present invention is as described above. If two devices 5 are inserted into the magnetic path as shown in FIG. 1, three kinds of signals can be produced from conversion circuit 13.

In this case, three select bars 9 are required. Three kinds of signals can be obtained by alternatively actuating these select bars 9 with push buttons $B_1$, $B_2$ and $B_3$ and thus a load can be operated.

In this embodiment, in other words, since three kinds of signals can be obtained from two devices, one device can be omitted as compared with the conventional method.

The number of devices and the number of signals are calculated according to the theory of permutation and combination and therefore the number of signals is greatly increased in accordance with increase of the number of devices.

Accordingly, if this apparatus is employed as the keyboard of a computer, four devices are sufficient.

Figure 4:
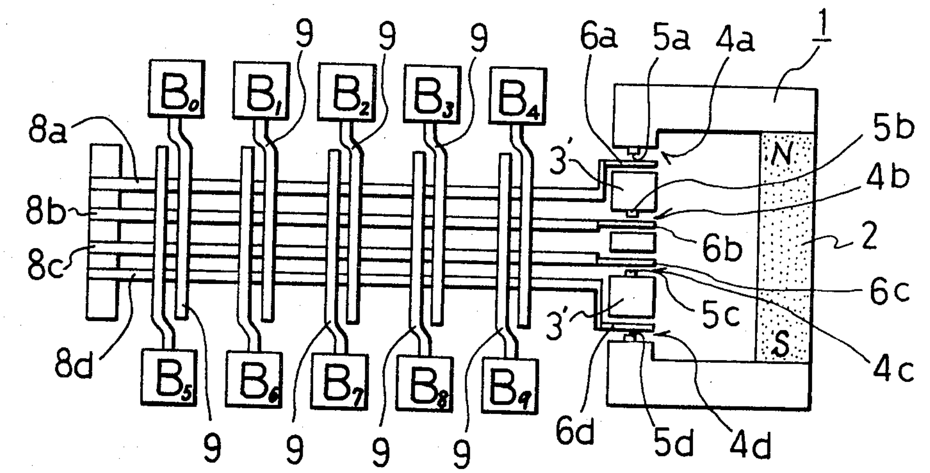
FIG. 4 is a plan view of another embodiment of the apparatus.
Figure 5:
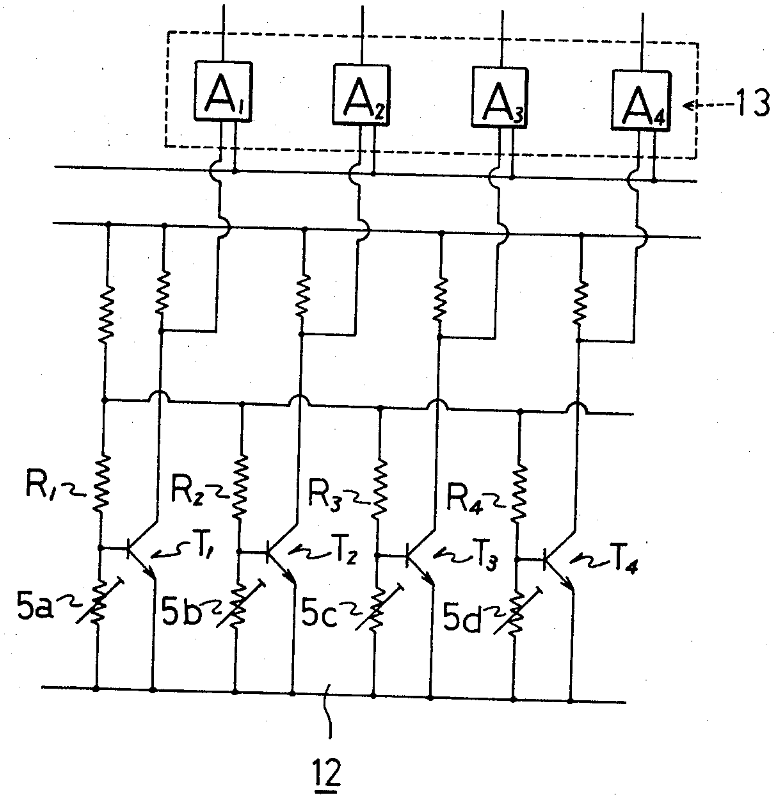
FIG. 5 is a circuit diagram of an embodiment of the detection circuit of the apparatus shown in FIG. 4.
Figure 6:
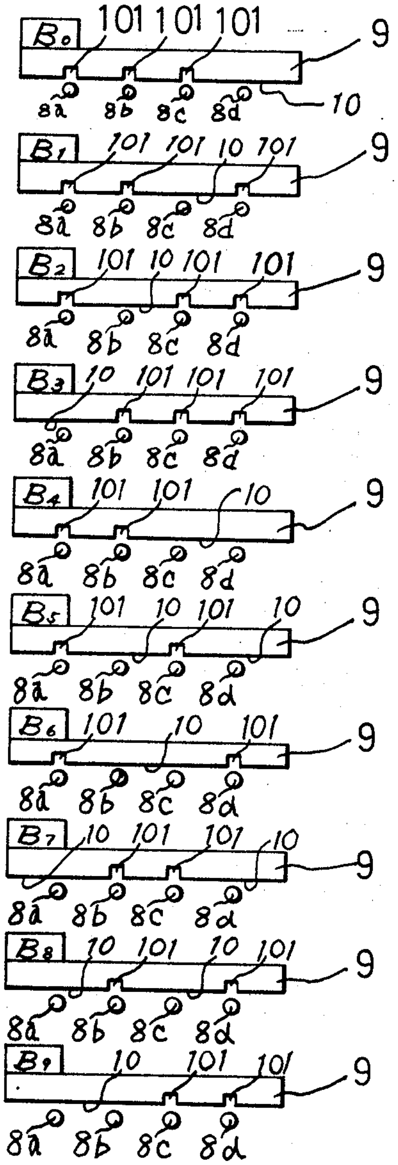
FIG. 6 is an explanatory view for the relationship between the select bars and operating levers employed in the apparatus shown in FIG. 4, FIGS. 7 and 8 are plan views illustrating another embodiment of the magnetic path of the apparatus.

The embodiments shown in FIGS. 4, 5 and 6 show said keyboard. Magnetic path 1 is provided with four gaps 4*a*, 4*b*, 4*c* and 4*d* and four devices 5*a*, 5*b*, 5*c* and 5*d*. Four operating levers 8*a*, 8*b*, 8*c* and 8*d* which actuate movable magnetic pieces 6*a*, 6*b*, 6*c* and 6*d* are arranged in parallel.

Ten select bars 9 are provided above the group of said operating levers 8 so that the select bars are arranged at a right angle to the operating levers and each select bar is provided with push buttons $B_0$ to $B_9$ respectively.

Said select bars 9 are positioned so that they are usually kept away from the group of operating levers by a resetting means such as resetting spring 11 and at least one notch 101 is provided at a predetermined position on the underside of the select bar opposed to the operating lever so that a non-selected operating lever is fitted into the notch when the select bar is lowered.

Notches 10 and operating levers 8 can be arranged so that combinations of operating bars which are operated by respective select bars are different one another as shown in FIG. 6; accordingly, in case of this embodiment, the number of mathematical permutations and combinations is fifteen and therefore ten types can be selected from these permutations and combinations.

Said detection circuit 12 can be formed as desired. However, if magnetro-resistance effect devices are employed, it is desirable to form the detection circuit by connecting devices 5*a*, 5*b*, 5*c* and 5*d* respectively to the bases of the transistors so that the transistors function with variation of internal resistance of the devices. FIG. 5 shows an example of such the circuit, in which devices 5*a*, 5*b*, 5*c* and 5*d* are respectively connected to the bases of NPN type transistors $T_1$, $T_2$, $T_3$ and $T_4$ and function to raise the base voltage of the transistors with concentration of the magnetic flux.

Accordingly, in this case, each magnetic piece 6 arranged in gap 4 of magnetic path 1 is usually positioned to be kept away from device 5 as shown in FIG. 3 and is positioned so that, when it is moved by operating lever 8, magnetic piece 6 is opposed the device which is shown with a broken line in FIG. 3.

The relationship between the device and the transistor differs, a matter of course, with the type of transistor and formation of the circuit. If the transistor employed is of the PNP type or magnetic piece 6 is usually kept to oppose the device and is kept away from the device when actuated by the operating lever, the devices can be inserted into in place of bias resistors $R_1$, $R_2$, $R_3$ and $R_4$ and the bias resistors can be inserted in place of the devices.

The collectors of said transistors $T_1$, $T_2$, $T_3$ and $T_4$ are respectively connected to a $2^1$ signal amplifier $A_1$ which generates the $2^1$ signal, a $2^2$ signal amplifier $A_2$ which generates the $2^2$ signal, a $2^3$ signal amplifier $A_3$ which generates the $2^3$ signal and a $2^4$ signal amplifier $A_4$ which generates the $2^4$ signal and conversion circuit 13 is formed by these amplifiers.

Conversion circuit 13 is connected to a logic circuit and a arithmetic circuit and converts the code signals generated from said amplifiers into specified numerical values.

Correspondence of a single or combined code signals from said conversion circuit 13 to numerical values is determined in advance by the logic circuit in the same manner as conventional. Since addition, subtraction, multiplication and division are carried out in the arithmetic circuit by means of a prior art, the detailed description is abridged.

This embodiment is as described above. When push button $B_0$ is depressed, selected bar 9 coupled to this push button is lowered to push down corresponding operating lever 8*d* to cause magnetic piece 6*d* to oppose device 5*d* and the magnetic flux to concentrate onto the device.

When device 5*d* receives the concentrating magnetic flux, the internal resistance of the device becomes large, the base voltage of transistor $T_4$ rises and transistor $T_4$ becomes on-state to actuate the $2^4$ signal amplifier $A_4$.

Accordingly, if the logic circuit is specified with the condition that $2^4$ signal corresponds to zero, the signal denoting zero is supplied from the logic circuit to the arithmetic circuit.

When push button $B_5$ is similarly depressed, operating levers 8*b* and 8*d* are lowered to actuate devices 5*b* and 5*d* and the $2^2$ signal and $2^4$ signal are supplied to the logic circuit. With these combination signals, numerical value 5 is fed to the arithmetic circuit. When push button $B_8$ is depressed, corresponding operating levers 8*a* and 8*c* are lowered and the $2^1$ signal and $2^3$ signal are supplied to the logic circuit. With these combination signals, numerical value 8 is fed to the arithmetic circuit. Therefore, the apparatus can be designed as described below.

Figure 7:
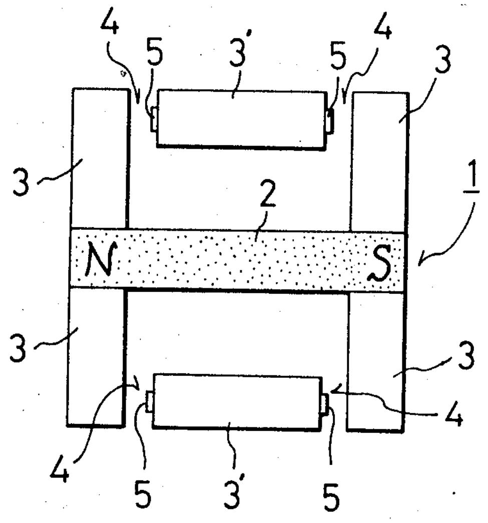

Magnetic path 1 can be formed as shown in FIG. 7, with one magnet 2 and yokes 3 which are fixed at both pole ends of the magnet so that the yokes and the pole ends of the magnet form respectively a T shape. With this arrangement, the distance between gaps of yokes 3 can be long.

Figure 8:
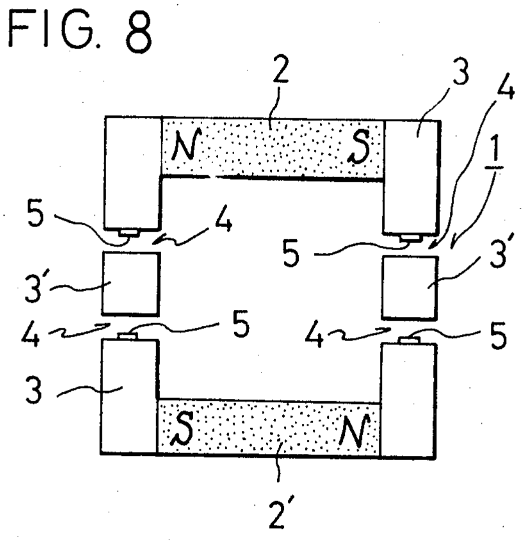

Magnetic path 1 can contain a plural number of magnets 2 and 2' as shown in FIG. 8. With this arrangement, the magnetic flux density can be increased.

Figure 9A:
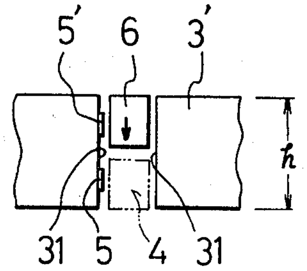
FIGS. 9*a* and 9*b* are magnified side views of an important view of the magnetic path illustrating an embodiment of arrangement of the galvano-magnetro effect devices.
Figure 9B:
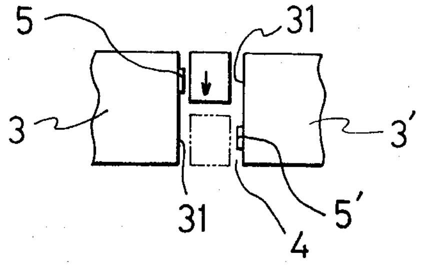
Figure 13:
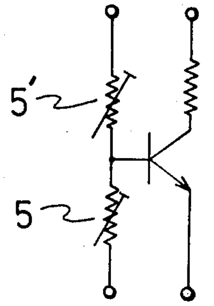
FIG. 13 is a circuit diagram of the detection circuit of the embodiments shown in FIGS. 9 and 12.

In gap 4, as shown in FIGS. 9*a* and 9*b*, a pair of devices 5 and 5' can be provided at two vertical positions and magnetic piece 6 can be moved to opposed to the devices alternatively. In this case, as shown in FIG. 13, if device 5′ is positioned in place of bias resistor $R_1$ (or $R_2$, $R_3$ or $R_4$) of detection circuit 12, the resistance values of device 5′ and operating device 5 of the bias resistor increase or decrease alternatively, the bias potential of the transistor greatly varies and therefore the action of the transistor can be ensured.

Said magnetic piece 6 can be arranged so as to protrude into and retract from gap 4. However, if the magnetic piece is designed to operate in the gap only as shown in FIG. 9*a*, that is, the stroke of the magnetic piece is smaller than height *h* of internal surface 31 of the yoke, the reluctance of magnetic path 1 can be kept fixed at all times and decrease of magnetism can be prevented.

Figure 10:
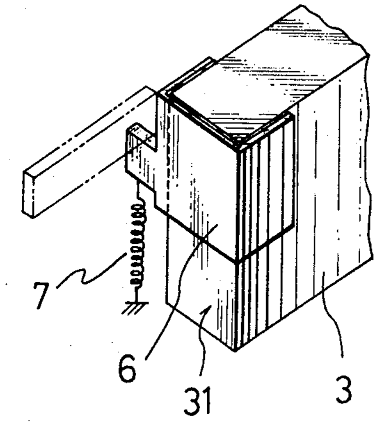
FIG. 10 is an isometric view illustrating an embodiment of the magnetic pieces.

Said magnetic piece 6 is preferred to be arranged to mount on a gap forming end of yoke 3 in the form of channel as shown in FIG. 10. In this arrangement, since magnetic piece 6 slides along yoke surface 31, it moves smoothly and the length of gap 4 can be reduced.

Figure 11:
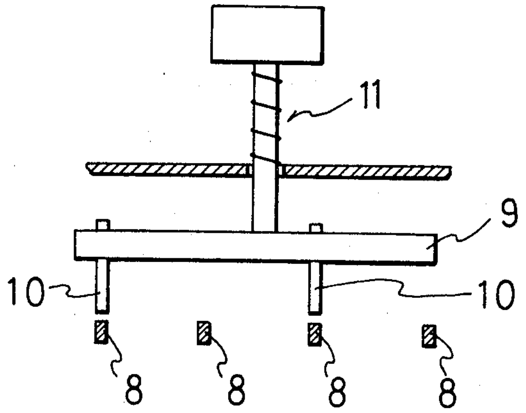
FIG. 11 is a side view illustrating an embodiment of the select bars.

Selecting means 10 of said select bar 9 can be formed by providing the notch at the operating lever in some cases or can be formed at the projected part of the select bar as shown in FIG. 11. In this case, if the projected part is threaded to be freely removed and remounted, its position and projection length can be selected and adjusted.

The group of said select bars consists of those shown below.

First, the group of select bars requires at least one select bar which causes a plural number of operating levers to operate at the same time. In other words, the maximum number of select bars which respectively actuate corresponding one operating lever is equal to the number of operating levers. In this case, therefore, the number of select bars cannot be larger than the number of operating levers.

Second, all select bars of the group can be designed so that each of them can cause a plural number of operating levers to operate. In this case, more than three operating levers are required.

Figure 12:
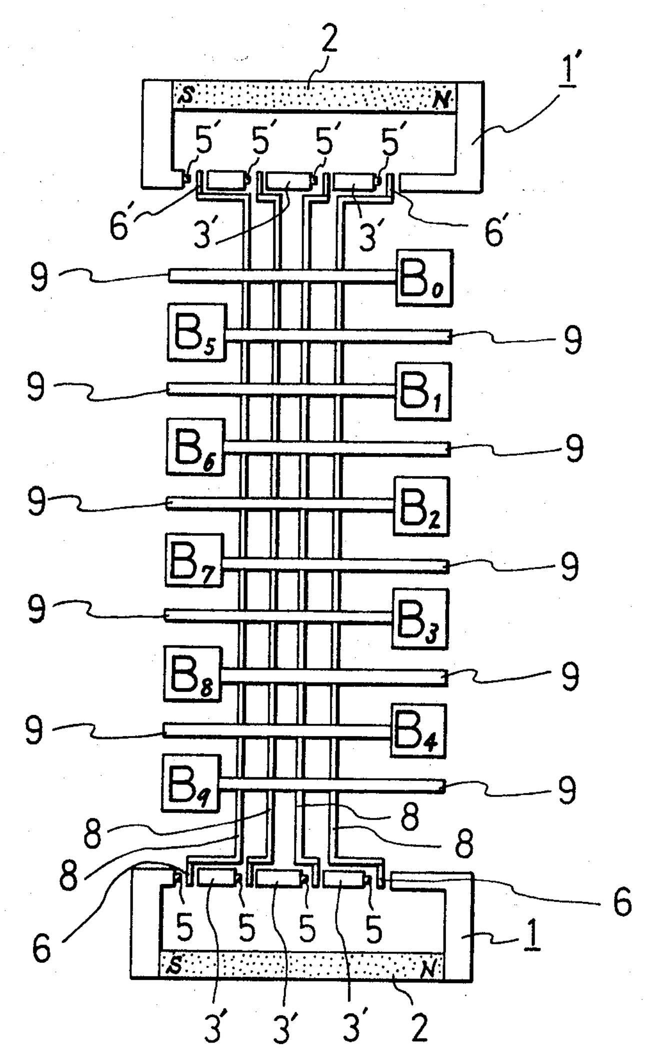
FIG. 12 is a plan view illustrating another embodiment of the apparatus according to the present invention.

Said magnetic path 1 can be combined with other magnetic path 1′ in the same design as a pair as shown in FIG. 12. In this case, a pair of magnetic paths are arranged so that the gaps formed in one magnetic path are opposed respectively to those formed in the gap of the other magnetic path and magnetic pieces 6 and 6′ inserted into opposed gaps of a pair of magnetic paths are arranged to oppose each other. Pairs of magnetic pieces 6 and 6′ are respectively fixed to both ends of operating levers 8.

In this embodiment, each pair of magnetic pieces 6 and 6′ can be moved at the same time and accordingly each pair of devices 5 and 5′ can be active at the same time. Furthermore, it is preferred to arrange the magnetic pieces and devices so that one of each pair of magnetic pieces is opposed to one of each pair of devices and the other of a pair of magnetic pieces is kept away from the other of a pair of devices, by means of a corresponding operating lever, that is, a pair of magnetic pieces 6 and 6′ are alternatively opposed to a pair of devices 5 and 5′. In this arrangement, detection circuit 12 as shown in FIG. 13 is formed and the effect described above can be obtained. For this purpose, device 5′ at one magnetic path can be deviated to the upper or lower side in reference to device 5 at the other magnetic path, that is, devices 5 and 5′ can be arranged so that magnetic piece 6 is opposed to device 5 while magnetic piece 6′ is not opposed to device 5′ and vice versa.

The apparatus according to the present invention is as described above. It provides the following advantages.

Since the apparatus can generate a number of different signals with a small number of the devices, the cost for expensive devices can be reduced, the circuit structure is simplified and thus the production cost of the apparatus can be reduced.

Because of a small number of devices, one magnetic path can be employed as shown with the embodiment, and consequently the output characteristic of the devices can be made uniform and the apparatus can be compacted. And also, a large-size magnet can be employed and the density of the magnetic flux flowing in the magnetic path can be intensified.

Moreover, if a magnetic path as shown in the embodiment shown in FIG. 10 is employed, the gap can be small as compared with the length of a magnet, mechanical accuracy is not required to be so high and thus workmanship is facilitated.

What is claimed is:

1. A galvano-magnetro effect apparatus comprised of a. a magnetic path having at least two gaps which are formed to intersect at a right angle to the direction of magnetic flux, b. at least one galvano-magnetro effect device being provided at the internal surface of a yoke end of the magnetic path forming each gap, c. a magnetic piece which is inserted into each gap so that it can be moved in a direction intersecting at a right angle to the direction of magnetic flux and varies the density of magnetic flux applied to said device by its movement, d. a resetting means which usually keeps each corresponding magnetic piece at its home position, e. operating levers which are respectively attached to said magnetic pieces and are arranged so that they are partly parallel each other, f. select bars in a number at least one larger than the number of operating levers which are arranged to overlap at a right angle to parallel-positioned parts of said operating levers and are usually prevented from being caused by said resetting means to depress the operating levers, g. selecting means which are respectively provided at least ones of said select bars and operating levers and selectively actuate at least one operating lever against the force of the resetting means for said select bars, and h. detection circuits which are provided respectively for said gaps and detect individually the actions of the devices provided in the gaps, wherein said magnetic pieces are moved against the resetting means by movement of said operating levers and selection of select bars by said selecting means is different.

2. A galvano-magnetro effect apparatus according to claim 1, wherein a group of select bars is comprised of at least two select bars which alternatively select one operating lever and one select bar which selects a plural number of operating levers in combinations.

3. A galvano-magnetro effect apparatus according to claim 1, wherein a group of select bars is comprised of at least two select bars which select a plural number of operating levers in different combinations and two select bars which alternatively select one operating lever.

4. A galvano-magnetro effect apparatus according to claim 1, wherein a group of select bars is comprised of at least four select bars which select a plural number of operating levers in different combinations.

5. A galvano-magnetro effect apparatus according to claim 1, wherein a selecting means is formed by a pushing edge which is divided by at least one notch provided at the select bar so that it is opposed to an operating lever which is not selected.

6. A galvano-magnetro effect apparatus according to claim 1, wherein a selecting means is formed by a projected part of a select bar which is opposed to an operating lever to be selected.

7. A galvano-magnetro effect apparatus according to claim 6, wherein said projected part of the select bar is threaded and fitted into the select bar.

8. A galvano-magnetro effect apparatus according to claim 1, wherein said magnetic path is comprised of one magnet positioned at the center, a pair of fixed yokes which are respectively attached to both ends of the magnet in T shape and at least one pair of independent yokes which are arranged between free ends of a pair of fixed yokes.

9. A galvano-magnetro effect apparatus according to claim 1, wherein said magnetic pieces move in the gaps only.

10. A galvano-magnetro effect apparatus according to claim 1, wherein a pair of galvano-magnetro effect devices are respectively arranged at vertical two positions in each gap and a large magnetic flux is alternatively applied to the devices according to movement of the magnetic piece.

11. A galvano-magnetro effect apparatus according to claim 1, wherein a pair of magnetic paths are formed so that the gaps are opposed each other and each pair of opposed magnetic pieces inserted respectively into the gaps of a pair of magnetic paths are respectively attached to both ends of one operating lever.

12. A galvano-magnetro effect device according to claim 11, wherein a pair of opposed magnetic pieces respectively attached to both ends of one operating lever are alternately opposed to a pair of the devices in accordance with movement of the operating levers.

* * * * *